(No Model.)
S. CLOUD.
DUST PAN.
No. 332,591. Patented Dec. 15, 1885.
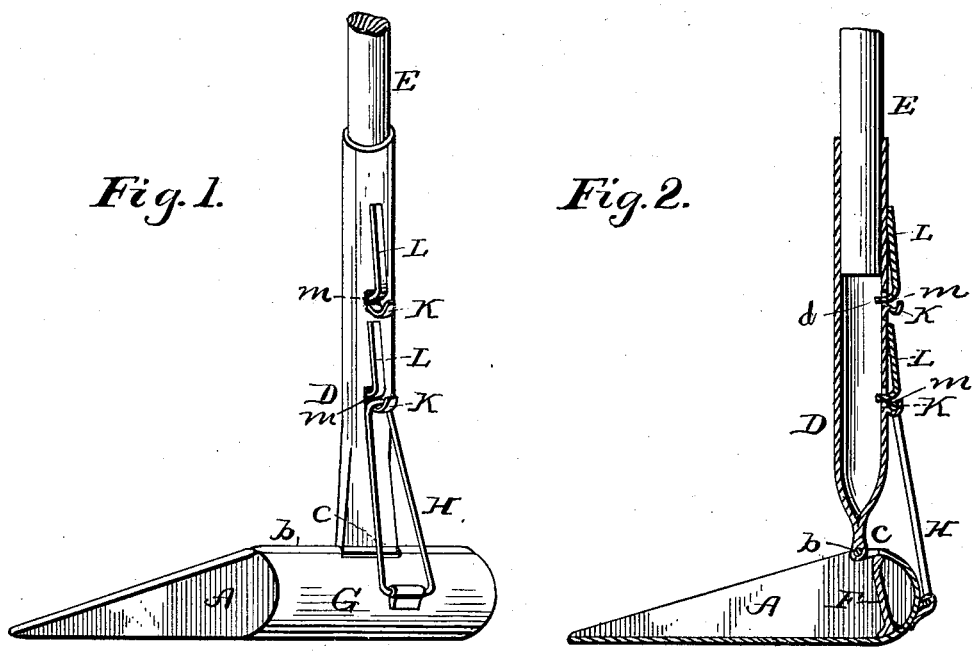
WITNESSES
B. Fugitt.
Phill? Masi.
INVENTOR
Silas Cloud
by Anderson & Smith
his ATTORNEYS

UNITED STATES PATENT OFFICE.

SILAS CLOUD, OF HUNTINGTON, INDIANA.

DUST-PAN.

SPECIFICATION forming part of Letters Patent No. 332,591, dated December 15, 1885.

Application filed September 23, 1885. Serial No. 177,923. (No model.)

*To all whom it may concern:*

Be it known that I, SILAS CLOUD, a citizen of the United States, residing at Huntington, in the county of Huntington and State of Indiana, have invented certain new and useful Improvements in Dust-Pans; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a perspective view. Fig. 2 is a section.

This invention has relation to dust-pans; and it consists in the construction and novel combination of parts as will be hereinafter fully described, and particularly pointed out in the claim.

In the accompanying drawings, the letter A designates the pan, which is usually formed with a recess or cavity in the back portion. A wire, $b$, is let into the seam in the upper margin of the back, strengthening the same. The marginal portion of the back is cut out, the wire $b$, however, remaining and engaging the barrel $c$ of the hinge end of the socket or handle-bearing D. This bearing or socket receives the long handle E; but the pan may be used with or without the long handle. A brace, F, may be used in the back, if desired, to support the same at the hinge. In rear, and below the hinge, the back G of the pan is provided with an elongated loop, H, which is pivoted to said back, and is designed to engage a catch, K, which is provided on the back of the handle or handle-socket. Usually the catches K are arranged in series, and are made in hook form, each catch being provided with a spring-tongue, L, the free end $d$ of which extends under the hook K, and is bent toward the body of the handle or socket, entering a recess, $m$, thereof. The object of this tongue is to prevent the loop H from becoming casually disengaged from the catch when attached thereto. Its bent end also facilitates the disengagement of the loop from the catch when pressure is applied for the purpose upon the handle, moving it rearward and holding the pan down steadily against the floor.

The catches are used in series in order to enable the operator to set the pan at different angles to the handle or to hold the handle against the pan when the latter is not required for use. In the latter arrangement the loop is disengaged from its catch, and may be utilized as a suspending-loop to hang the instrument from a wall peg or nail.

I am aware that it is not new to provide a dust-pan with a hinged handle and provide the same with a slide-collar designed to engage a loop connected with the pan and adapted to be adjusted longitudinally on the handle.

Having described this invention, what I claim, and desire to secure by Letters Patent, is—

A dust-pan having a hinged handle-socket provided with a catch, K, consisting of a spring-tongue formed with a bent end under said catch and entering a recess of said socket, substantially as specified.

In testimony whereof I affix my signature in presence of two witnesses.

SILAS CLOUD.

Witnesses:
 J. M. HILTEBRAND,
 MICHAEL W. MOORE.